US012068603B2

(12) United States Patent
Lee (10) Patent No.: US 12,068,603 B2
(45) Date of Patent: Aug. 20, 2024

(54) DEMAND MANAGEMENT CONTROL METHOD AND APPARATUS FOR INDUCING DYNAMIC PARTICIPATION OF CONSUMERS IN ENERGY CONSUMPTION LOADS MANAGEMENT PROGRAM

(71) Applicant: Electronics and Telecommunications Research Institute, Daejeon (KR)

(72) Inventor: Seok-jin Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 134 days.

(21) Appl. No.: 17/476,046

(22) Filed: Sep. 15, 2021

(65) Prior Publication Data
US 2022/0094162 A1    Mar. 24, 2022

(30) Foreign Application Priority Data

Sep. 21, 2020  (KR) .......................... 10-2020-0121363
Jun. 10, 2021  (KR) .......................... 10-2021-0075404

(51) Int. Cl.
*H02J 3/00*         (2006.01)
*G06Q 30/02*        (2023.01)
(Continued)

(52) U.S. Cl.
CPC .......... *H02J 3/003* (2020.01); *G06Q 30/0206* (2013.01); *G06Q 50/06* (2013.01); *H02J 3/144* (2020.01)

(58) Field of Classification Search
CPC .... G05B 13/026; G05B 15/02; G05B 19/042; G05B 2219/2639; G05B 2219/2642;
(Continued)

(56) References Cited

U.S. PATENT DOCUMENTS 8,521,337 B1 * 8/2013 Johnson .................. H02J 3/008
                                                 700/297
8,725,306 B2 * 5/2014 Ramezani ............... B60L 53/63
                                                 700/297
(Continued)

FOREIGN PATENT DOCUMENTS

JP           5661195       12/2014
KR     10-2014-0089038      7/2014
(Continued)

*Primary Examiner* — M. N. Von Buhr
(74) *Attorney, Agent, or Firm* — KILE PARK REED & HOUTTEMAN PLLC (57) ABSTRACT

Disclosed are a demand management control method and a demand management control apparatus for inducing dynamic participation of a consumer in an energy consumption load management program. The demand management control method refers to a promotion method for expanding an active participation of a consumer through a dynamic order of charging power of a charging load device with respect to a load having a consumption characteristic in an energy accumulation form in a distribution network management area in which an energy charging supply device is installed, and distributes and manages a demand within an energy supply goal of the consumer through a participation promotion. Also, the demand management control method provides changed cost information to the consumer using an incentive through a demand management contribution weight according to an energy demand and supply status and encourages or promotes the dynamic participation of the consumer.

10 Claims, 8 Drawing Sheets

(51) Int. Cl.
  *G06Q 30/0201* (2023.01)
  *G06Q 50/06* (2024.01)
  *H02J 3/14* (2006.01)

(58) Field of Classification Search
  CPC ..... G05B 2219/25357; G06Q 30/0206; G06Q 30/0283; G06Q 50/06; G06Q 50/18; G06Q 10/10; G06Q 10/06315; H02J 3/003; H02J 3/144; H02J 3/322; H02J 2310/60; H02J 7/0071; H02J 7/007188; Y02B 70/3225; Y04S 20/222; Y04S 50/14; Y04S 10/126; Y04S 30/14; Y02T 90/12; Y02T 90/167; Y02T 10/70; Y02T 10/7072; B60L 53/62; B60L 53/63; B60L 53/64; B60L 53/665; B60L 55/00
  See application file for complete search history.

(56) References Cited

U.S. PATENT DOCUMENTS

| | | | | |
|---|---|---|---|---|
| 8,957,634 | B2* | 2/2015 | Lo | H02J 7/0013 |
| | | | | 700/286 |
| 9,496,734 | B2* | 11/2016 | Yamamoto | B60L 53/62 |
| 10,191,459 | B2* | 1/2019 | Oono | G05B 19/042 |
| 10,581,271 | B2* | 3/2020 | Hong | G06F 17/11 |
| 10,752,123 | B2* | 8/2020 | Patil | B60L 53/63 |
| 10,800,282 | B2* | 10/2020 | Jang | G06Q 30/0283 |
| 10,857,900 | B2* | 12/2020 | Uyeki | B60L 53/65 |
| 11,130,421 | B2* | 9/2021 | Marcial-Simon | B60L 53/305 |
| 11,171,484 | B2* | 11/2021 | Frolik | H04L 12/6418 |
| 11,267,361 | B2* | 3/2022 | He | B60L 53/30 |
| 11,411,402 | B1* | 8/2022 | Singh | G06Q 50/06 |
| 11,502,529 | B2* | 11/2022 | Tseng | H02J 7/00714 |
| 11,590,857 | B2* | 2/2023 | Ruan | B60L 58/13 |
| 2010/0076825 | A1* | 3/2010 | Sato | B60L 53/65 |
| | | | | 705/14.1 |
| 2010/0292855 | A1* | 11/2010 | Kintner-Meyer | B60L 53/14 |
| | | | | 700/36 |
| 2012/0235646 | A1 | 9/2012 | Lo et al. | |
| 2013/0166428 | A1 | 6/2013 | Hwang et al. | |
| 2014/0117933 | A1 | 5/2014 | Nyu | |
| 2014/0277797 | A1 | 9/2014 | Mokhtari et al. | |
| 2015/0217657 | A1 | 8/2015 | Kang et al. | |
| 2017/0050529 | A1* | 2/2017 | Lambert | B60L 58/12 |
| 2019/0184844 | A1* | 6/2019 | Uyeki | B60L 53/63 |
| 2021/0170903 | A1* | 6/2021 | Tsuchiya | B60L 58/16 |
| 2021/0284039 | A1* | 9/2021 | Ando | B60L 53/63 |
| 2021/0325069 | A1* | 10/2021 | Cotton | B60L 53/30 |

FOREIGN PATENT DOCUMENTS

| | | |
|---|---|---|
| KR | 10-1487186 | 2/2015 |
| KR | 10-2015-0048262 | 5/2015 |
| KR | 10-2016-0078677 | 7/2016 |
| KR | 10-2094353 | 3/2020 |
| WO | 2015/060498 | 4/2015 |
| WO | 2020/101056 | 5/2020 |

* cited by examiner

DEMAND MANAGEMENT CONTROL METHOD AND APPARATUS FOR INDUCING DYNAMIC PARTICIPATION OF CONSUMERS IN ENERGY CONSUMPTION LOADS MANAGEMENT PROGRAM

CROSS-REFERENCE TO RELATED APPLICATION(S)

This application claims the benefit of Korean Patent Application No. 10-2020-0121363 filed on Sep. 21, 2020, and Korean Patent Application No. 10-2021-0075404 filed on Jun. 10, 2021, in the Korean Intellectual Property Office, the entire disclosure of which is incorporated herein by reference for all purposes.

BACKGROUND

1. Field of the Invention

One or more example embodiments relate to a demand management control method and a demand management control system for inducing a dynamic participation of a consumer in an energy consumption load management program, and more particularly, to an apparatus and method for inducing a dynamic participation of a consumer for a plurality of "energy charging supply devices" in a distribution network management area for a distributed management of a peak demand that burdens a power capacity of an energy supply system and remotely controlling the same in real time.

2. Description of the Related Art

In general, a power system needs to make a balance between a power supply and a power demand to more reasonably use limited electrical energy. The electrical energy requires a lot of supply-side investment since the balance between supply and demand is sensitive every moment. As a peak load according to an amount of power demand occurs by time zone, reliability of the power system needs to be secured to cope with the peak load. This may greatly improve cost efficiency if parallel management is performed on a demander side, instead of imposing all the burden on a supplier side.

Accordingly, the power system requires various techniques for reducing an investment demand for peak-linked supply facilities. The power system performs a demand management on the demander side in parallel with a stabilization operation method on the supplier side. Here, the demand management (DM) refers to a plan or an activity that allows the supplier side to reasonably control and adjust an energy use form of the demander side and may overcome a reliability issue by adjusting an amount of use according to a system situation.

A demand response (DR) refers to a response of the demand side to a management activity of the supplier side and a demand response policy may be divided into a rate-based program and an incentive-based program.

A rate-based demand response program has some restrictions, such as securing correct price signals and smart home appliances, to precisely apply a rate system application time to a consumption site according to wholesale market price by time zone.

Also, an incentive-based demand response program refers to a method of providing an incentive for demand reduction performance to a consumer having signed a demand reduction contract in response to an occurrence of a corresponding event, to maintain the balance between supply and demand. However, in suppressing consumption in such a specific time, that is, in executing a load reduction, the inconvenience of consumers needs to be considered. Also, consumption should not be restrained for protection of consumer rights and interests. Therefore, a demand management system may include operating rules, such as annual cumulative time limit and a duration time limit of issuance.

To expand a dynamic control operation influence through a demand response, there is a need for a method of expanding a demand response resource capacity for which a load reduction is manageable. Also, there is a need for a method of improving flexibility of a demand response resource operation that reduces a rigidity by improving load reduction operation constraints. Here, the rigidity refers to a "resource response start time from issuance of a load reduction" and an "accumulative time for applying a load reduction." If there is an opportunity to apply a consumption load characteristic to a demand response system, a more demand response resource capacity flexible for a system operation may be secure.

SUMMARY

Example embodiments provide a method and apparatus that may provide a participation promotion for inducing a dynamic participation of a consumer in a demand management program for charging, that is, a load having a consumption characteristic in an energy accumulation form in a distribution network management area.

Example embodiments provide a method and apparatus that may contribute to energy supply stability and economic improvement by operating an incentive system variably determined based on a power operation situation and by proposing a demand management method for inducing an active participation of a consumer based on an individual circumstance.

Example embodiments propose a model for increasing a flexible demand response resource capacity through a promotion that expands a real-time remote control business for intermittent charging based on a participatory order of a consumer with respect to a load of a cumulative characteristic.

According to an aspect, there is provided a demand management control method including receiving, from a user, a charging order sheet for supplying power to a charging load device that is plugged into an energy charging supply device in a distribution network management area; determining a charging allowance period of the charging load device that is plugged into the energy charging supply device based on the charging order sheet; providing a participation promotion in which a demand management contribution weight of the charging load device for an operation of the energy charging supply device according to the charging allowance period of the charging load device is applied; and in response to receiving a participation order for the participation promotion from the user, controlling charging in a peak time according to a charging schedule of the charging load device and controlling a peak demand of the energy charging supply device.

The receiving of the charging order sheet may include monitoring a load state of the distribution network management area to verify an allowable power capacity until the charging load device is powered ON through plugging; and receiving the charging order sheet at a charging start point in time of the charging load device when the charging load device is powered ON through plugging.

The determining of the charging allowance period of the charging load device may include determining the charging allowance period by applying the participation promotion based on at least one of an available charging point in time, an available charging period, a current magnitude, and a required capacity included in the charging order sheet.

The charging allowance period may represent a period during which charging of the charging load device is temporally holdable according to a charging period required for the available charging period and the required capacity.

The determining of the demand management contribution weight may include determining a demand management contribution weight for a rate operation and a demand management of the energy charging supply device using a distribution value of peak load and a charging limit of the energy charging supply device.

The controlling of the peak demand of the energy charging supply device may include reducing or holding charging in the peak time in which a charging load occurs in the charging process according to the charging schedule and controlling the peak demand of the energy charging supply device in the distribution network management area through discontinuous charging.

The demand management control method may further include providing an incentive for a management contribution performance according to energy cost based on at least one of the demand management contribution weight, the charging allowance period, and a charging order capacity.

According to another aspect, there is provided a demand management control method including determining a demand management contribution weight of a charging load device for an operation of an energy charging supply device installed in a distribution network management area; providing a participation promotion that includes an incentive for a management contribution performance according to energy cost to the charging load device that is plugged into the energy charging supply device; determining a charging schedule for a dynamic control of the energy charging supply device based on a charging order sheet according to the participation promotion; and reducing or holding charging in a peak time according to the charging schedule and controlling a peak demand of the energy charging supply device.

The determining of the demand management contribution weight nay include determining a charging allowance period of the charging load device based on at least one of an available charging point in time, an available charging period, a current magnitude, and a required capacity included in the charging order sheet; and determining a demand management contribution weight of the charging load device for an operation of the energy charging supply device in the distribution network management area based on the charging allowance period of the charging load device.

The determining of the demand management contribution weight may include determining a demand management contribution weight for a rate operation and a demand management of the energy charging supply device using a distribution value of peak load and a charging limit of the energy charging supply device in the distribution network management area.

The providing of the participation promotion may include variably setting an incentive for a management contribution performance based on at least one of the demand management contribution weight, the charging allowance period, and a charging order capacity; and providing a participation promotion for inducing charging of a consumer through the variably set incentive.

The controlling of the peak demand of the energy charging supply device may include reducing or holding charging in the peak time in which a charging load occurs in the charging process according to the charging schedule and controlling the peak demand of the energy charging supply device through discontinuous charging.

According to still another aspect, there is provided a demand management control apparatus including a processor. The processor is configured to receive, from a user, a charging order sheet for supplying power to a charging load device that is plugged into an energy charging supply device in a distribution network management area, determine a charging allowance period of the charging load device that is plugged into the energy charging supply device based on the charging order sheet, provide a participation promotion in which a demand management contribution weight of the charging load device for an operation of the energy charging supply device according to the charging allowance period of the charging load device is applied, and in response to receiving a participation order for the participation promotion from the user, control charging in a peak time according to a charging schedule of the charging load device and control a peak demand of the energy charging supply device.

The processor may be configured to determine the charging allowance period by applying the participation promotion based on at least one of an available charging point in time, an available charging period, a current magnitude, and a required capacity included in the charging order sheet.

The processor may be configured to determine a demand management contribution weight for a rate operation and a demand management of the energy charging supply device using a distribution value of peak load and a charging limit of the energy charging supply device in the distribution network management area.

The processor may be configured to reduce or hold charging in the peak time in which a charging load occurs in the charging process according to the charging schedule and control the peak demand of the energy charging supply device through discontinuous charging.

According to still another aspect, there is provided a demand management control apparatus including a processor. The processor is configured to determine a demand management contribution weight of a charging load device for an operation of an energy charging supply device installed in a distribution network management area, provide a participation promotion that includes an incentive for a management contribution performance according to energy cost to the charging load device that is plugged into the energy charging supply device, determine a charging schedule for a dynamic control of the energy charging supply device based on a charging order sheet according to the participation promotion, and control a peak demand of the energy charging supply device by reducing or holding charging in a peak time according to the charging schedule.

The processor may be configured to determine a charging allowance period of the charging load device based on at least one of an available charging point in time, an available charging period, a current magnitude, and a required capacity included in the charging order sheet, and determine a demand management contribution weight of the charging load device for an operation of the energy charging supply device in the distribution network management area based on the charging allowance period of the charging load device.

The processor may be configured to variably set an incentive for a management contribution performance based on at least one of the demand management contribution weight, the charging allowance period, and a charging order capacity, and provide a participation promotion for inducing charging of a consumer through the variably set incentive.

The processor may be configured to reduce or hold charging in the peak time in which a charging load occurs in the charging process according to the charging schedule and control the peak demand of the energy charging supply device through discontinuous charging.

Additional aspects of example embodiments will be set forth in part in the description which follows and, in part, will be apparent from the description, or may be learned by practice of the disclosure.

According to example embodiments, it is possible to provide a participation promotion for expanding participants to a power demand management business that remotely controls a peak load, that is, a load having a consumption characteristic in an energy accumulation form in a distribution network management area.

According to example embodiments, when a distributed management of a peak load that imposes burden on a power capacity of a distribution network, it is possible to activate a demand response in economic terms.

According to example embodiments, it is possible to expand voluntary participation order of consumers by providing a participation promotion that allows a dynamic order according to an energy demand situation suitable for a demand management with respect to a load having an energy accumulation characteristic.

According to example embodiments, it is possible to maintain a reliability for peak power in a distribution network management area by expanding a power capacity of flexible demand response resources for a demand management at a peak load using a new load characteristic such as battery charging.

According to example embodiments, a real-time remote control based on an active consumer participatory order through expansion of consumer participation methods may expand a demand response resource capacity and may flexibly adjust an operation and may be added as a single new system in addition to the existing power DR systems (a peak reduction DR, a rate reduction DR, and a public DR) operated in Korea.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 3, (a) and (b), illustrate a concept of effect of distributing and managing a peak load according to an economic demand response according to an example embodiment;

FIG. 5, (a), (b), and (c), illustrate an execution effect and response of a demand management contribution weight according to an example embodiment;

DETAILED DESCRIPTION

The following structural or functional descriptions of example embodiments described herein are merely intended for the purpose of describing the example embodiments described herein and may be implemented in various forms. However, it should be understood that these example embodiments are not construed as limited to the illustrated forms.

Various modifications may be made to the example embodiments. Here, the example embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components. In addition, it should be noted that if it is described in the specification that one component is "directly connected" or "directly joined" to another component, still other component may not be present therebetween. Likewise, expressions, for example, "between" and "immediately between" and "adjacent to" and "immediately adjacent to" may also be construed as described in the foregoing.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings.

Figure 1:
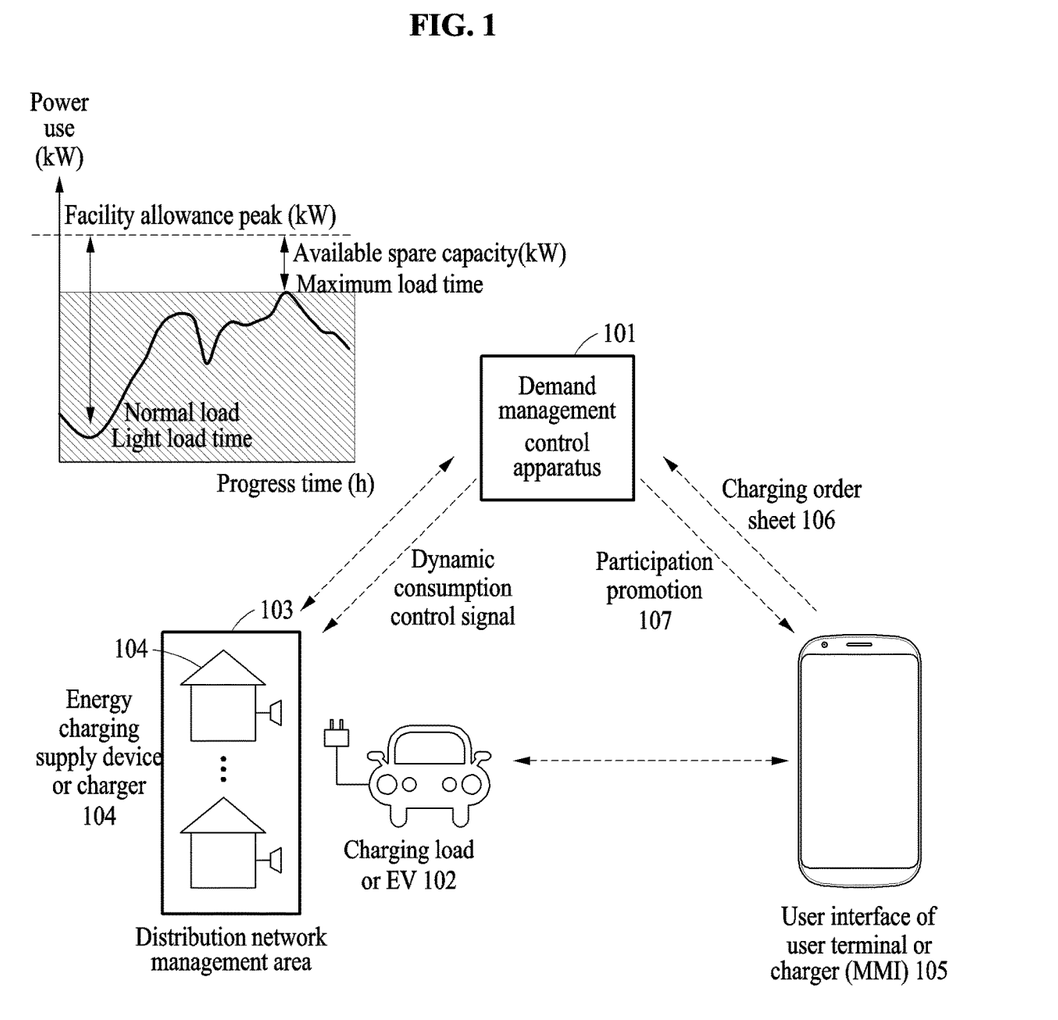
FIG. 1 illustrates an operation of electric vehicle supply equipment (EVSE) to describe an overall operation of a demand management control system for a distributed management of a peak load according to an example embodiment.

FIG. 1 illustrates an operation of electric vehicle supply equipment (EVSE) to describe an overall operation of a demand management control system for a distributed management of a peak load according to an example embodiment.

Referring to FIG. 1, in response to receiving a charging order sheet 106 for supplying power to a charging load device (loads) 102, a demand management control apparatus 101, e.g., a demand management controller or a demand management control system, may provide a consumer with a participation promotion 107 for distributing a peak load generated in an energy charging supply device 104, e.g., a charging supply equipment or charger, in a distribution network management area 103, based on the charging order sheet 106. In response to receiving a participation order from a consumer according to the participation promotion 107, the demand management control apparatus 101 may control charging in a peak time according to a charging schedule of the charging load device 102 and thereby control a peak demand through the energy charging supply device 104.

In detail, when the consumer inputs the charging order sheet 106 through a user terminal 105 for charging, the demand management control apparatus 101 may provide the participation promotion 107 for remotely controlling a charging load occurring in the process of charging power of the charging load device 102. The participation promotion 107 may be promoting or encouraging information used to induce a dynamic participation order of a consumer when a load management is required to distribute a peak demand in the energy charging supply device 104 in the distribution network management area 103.

Also, the participation promotion 107 may include a motivation condition for a distributed management of a demand of the distribution network management area 103 within an energy supply goal of the consumer. With respect to a load having an energy accumulation characteristic, the demand management control apparatus 101 may provide the participation promotion 107 to an online real-time management control program for each distribution network management area 103.

In response to receiving the participation order for the participation promotion 107 from the user terminal 105, the demand management control apparatus 101 may control a charging load online in real time during a period in which the charging load device 102 is connected to the energy charging supply device 104 for charging. Here, the demand management control apparatus 101 may provide a separate incentive to a consumer that participates in a demand management through the energy charging supply device 104 as a demand management contribution performance. The demand management control apparatus 101 may provide a user with a charging promotion related to a participation order through the user terminal 105 to extend an available charging holdable period for charging of the charging load device 102 through the incentive.

Here, the demand management control apparatus 101 may induce the user to more voluntarily participate in a demand management by measuring a relatively high incentive to be presented to the user according to an increase in the available charging holdable period and providing changed cost information to the user through the participation promotion 107. Also, the example embodiment provides a structure in which a supplier side controls a charger, that is, the energy charging supply device 104 in real time, and the demand management control apparatus 101 may perform discontinuous charging by controlling a point-of-consumption in favor of an operation of the supplier side. The demand management control apparatus 101 may control a peak demand in the distribution network management area 103 by performing discontinuous charging on the charging load device 102.

Accordingly, the demand management control apparatus 101 may make a charging transaction between a charging energy supplier (i.e., an operator of the energy charging supply device 104) and the charging load device 102 by applying the participation promotion 107 related to details of the charging order sheet 106, a power demand and supply status, and a supply policy. Here, the charging transaction may be made in such a manner that a charging promotion proposal from the supplier side and charging order from the consumer side are negotiated through a consumption schedule management and the demand management control apparatus 101 may control an elastic demand load with a reduced response time accordingly.

Figure 2:
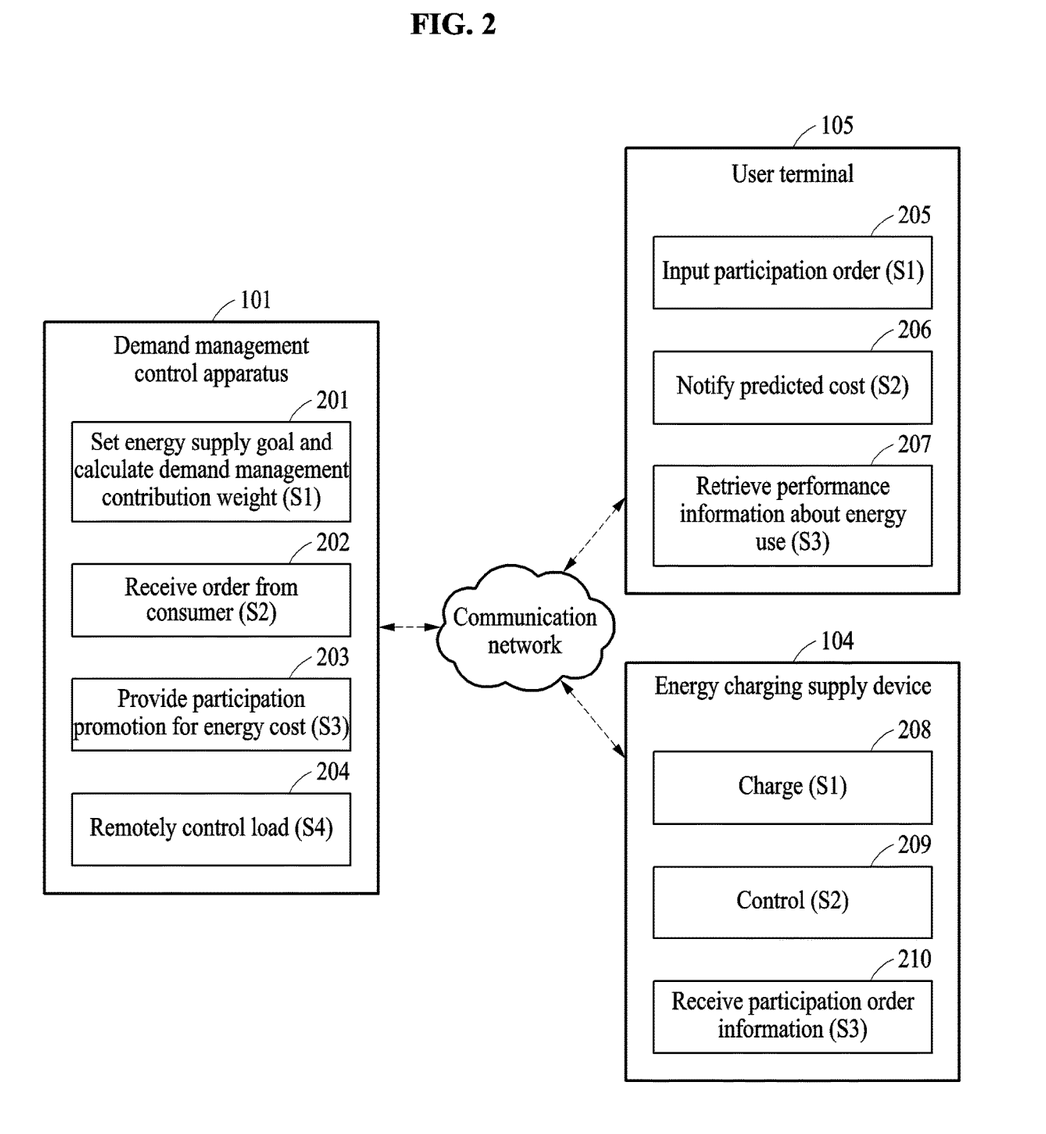
FIG. 2 is a diagram to describe a detailed operation of each apparatus that constitutes a demand management control system according to an example embodiment.

FIG. 2 is a diagram to describe a detailed operation of each apparatus that constitutes a demand management control system according to an example embodiment.

Referring to FIG. 2, the demand management control system may include the demand management control apparatus 101, the energy charging supply device 104, and the user terminal 105, and may expand and induce a participation in controlling a peak load by distributing and managing a charging load through application of technology proposed herein. The demand management control system may hold and distribute a demand in a time in which a peak load is concentrated by dynamically controlling a charging load of the energy charging supply device 104 according to participation order from a consumer and may secure flexibility on an operation side of a power supply system accordingly. Also, the demand management control system may be used as a method capable of economically securing reliability of the energy charging supply device 104. Hereinafter, a detailed operation of each configuration is explained.

① Demand Management Control Apparatus

In S1 201, a demand management control apparatus 101 may set an energy supply goal of each energy charging supply device 104 present in a distribution network management area. Here, the energy supply goal may refer to a charging power capacity that may be supplied to a charging load device, compared to a total power capacity that may be supplied from each energy charging supply device 104 over time. The demand management control apparatus 101 may determine a demand management contribution weight of the charging load device that participates in a demand management, based on the energy supply goal set to each energy charging supply device 104. Here, when a final operation value is determined through machine learning by the demand management control apparatus 101, a final demand management contribution weight may be determined by a supply facility operator.

In S2 202, the demand management control apparatus 101 may receive, from a user terminal 105, a charging order sheet for supplying power to the charging load device that is plugged into the energy charging supply device 104 in the distribution network management area. Here, the demand management control apparatus 101 may monitor a consumption status of the distribution network management area to verify an allowable power capacity until the charging load device is powered ON through plugging, or may predict a demand based on previous experience data. Once the charging load device is powered ON through plugging, the demand management control apparatus 101 may receive the charging order sheet at a charging start point in time of the charging load device according to the consumption status of the energy charging supply device 104.

In S3 203, the demand management control apparatus 101 may provide a participation promotion for energy cost based on the charging order sheet. The demand management control apparatus 101 may determine a charging allowance period of the charging load device that is plugged into the energy charging supply device 104 based on at least one of an available charging point in time, an available charging period, a current magnitude, and a required capacity included in the charging order sheet. The demand management control apparatus 101 may determine a demand management contribution weight of the charging load device for an operation of the energy charging supply device 104 according to the charging allowance period of the charging load device 102. The demand management control apparatus 101 may encourage or promote a participation in a demand management program by providing a consumer with changed cost information through the demand management contribution weight to be applied to an incentive according to an energy demand and supply status.

The demand management control apparatus 101 may determine an incentive for a management contribution performance according to energy cost based on at least one of the demand management contribution weight, the charging allowance period, and a charging order capacity. The demand management control apparatus 101 may provide the user terminal 105 with the participation promotion in which the incentive and the demand management contribution weight are applied.

Here, the demand management control apparatus 101 may use an energy demand management program in which a consumer places an order and a supplier remotely controls a consumption-side load during an order period. The demand management control apparatus 101 may provide a dynamic order-based charging promotion that provides a situation-based variable incentive to induce a valid control period to be extended using the energy demand management program.

In S4 204, in response to receiving a participation order for the participation promotion from the user terminal 105, the demand management control apparatus 101 may control charging in a peak time according to a charging schedule of the charging load device and may control a peak demand of the energy charging supply device 104. The demand management control apparatus 101 may provide an optimal incentive in which the demand management contribution weight is applied through machine learning as bigdata related to energy demand and supply and may distribute and manage a demand within the energy supply goal through the participation promotion for the demand management.

② User Terminal

Herein, the user terminal 105 refers to an information input/output method for a charging order and also refers to a method of using a mobile phone of a "charging load device" user and a method of a user interface (e.g., a man machine interface (MMI)) built in a charger.

In S1 205, the user terminal 105 may transfer, to the demand management control apparatus 101, the charging order sheet for supplying power of the charging load device that is plugged into the energy charging supply device 104 in the distribution network management area. The charging order sheet may include an available charging point in time, an available charging period, a current magnitude, a required capacity, an ID of the consumer, an ID of the distribution network management area, and an ID of the energy charging supply device 104.

In S2 206, the user terminal 105 may receive participation promotion information about the charging order sheet from the demand management control apparatus 101. The user terminal 105 may verify time and predicted cost used to charge the charging load device based on the participation promotion information. The user terminal 105 may transfer a participation order representing consent to the participation promotion to the demand management control apparatus 101.

In S3 207, the user terminal 105 may retrieve performance information about energy use in the process of charging the charging load device.

③ Energy Charging Supply Device

In S1 208, the energy charging supply device 104 may charge the charging load device with energy by supplying power to the charging load device according to the charging schedule of the charging load device.

In S2 209, the energy charging supply device 104 may discontinuously control charging of the charging load device in response to a dynamic consumption control signal transferred from the demand management control apparatus 101.

In S3 210, the energy charging supply device 104 may receive information about the participation order by the demand management control apparatus 101.

Figure 3:
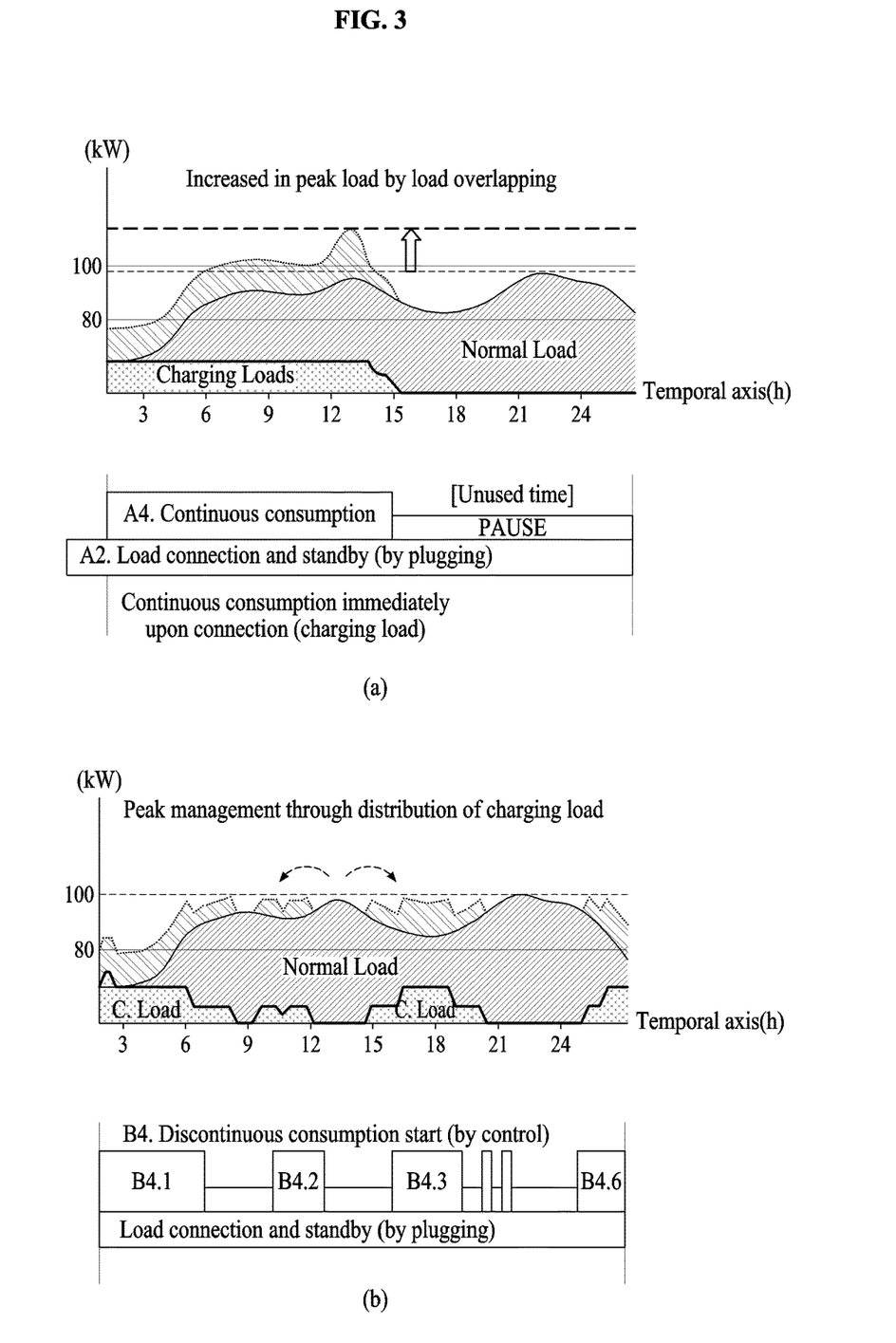

FIG. 3, (a) and (b), illustrate a concept of effect of distributing and managing a peak load according to an economic demand response according to an example embodiment.

Power consumption fluctuates over time and energy facilities need to be capable of supplying power used by a consumer. For example, typical residential power distribution facilities are constructed by referring to a standard of 3 kilowatts (kW) and energy facilities for factories, buildings, and apartments are constructed by referring to an expected demand capacity. Also, energy generation facilities are operated with a required capacity at every point in time and energy supply facilities are configured to determine a situation over an allowable peak value as an overload and to cut off power supply. A lot of investment is required to secure sufficient energy facilities. Therefore, an allowable peak capacity of an energy charging supply device is determined based on a pre-calculated power usage.

Therefore, the example embodiment may provide an efficient method for distributing and managing a peak load by comparing a continuous consumption scheme and a discontinuous consumption scheme through graphs of FIG. 3.

The graph shown in (a) of FIG. 3 represents a power consumption time with respect to an allowable peak capacity of the energy charging supply device according to the continuous consumption scheme. The continuous consumption scheme refers to a case in which charging requests from a plurality of charging load devices are biased in a specific time zone and may verify a charging load of the charging load devices that are plugged into the energy charging supply device. Also, the continuous consumption scheme may verify generation of a new facility allowance size as a capacity of a charging load is temporarily concentrated in addition to a normal load that occurs in the charging process. Here, the new facility allowance size may represent an increased peak load caused by load overlapping in a form in which the charging load and the normal load are accumulated.

Also, referring to a consumption time of the energy charging supply device, in the continuous consumption scheme, a continuous consumption peak occurs immediately after the charging load device is plugged into the energy charging supply device. Also, in the continuous consumption scheme, even after charging of the charging load device is completed, the charging load device may be in a state connected to the energy charging supply device and a connection load or a standby load may occur accordingly.

On the other hand, the graph shown in (b) of FIG. 3 represents a power consumption time with respect to an allowable peak capacity of the energy charging supply device according to the discontinuous consumption scheme. The discontinuous consumption scheme avoids a specific time zone and refers to an evenly distributed case based on a charging allowance period of charging load devices connected to the energy charging supply device, and may verify that a peak load does not exceed a preset threshold, although the charging load of the charging load devices plugged into the energy charging supply device occurs. Also, since a charging load occurs without exceeding a maximum peak value with reference to a normal load, the discontinuous consumption scheme may distribute and manage a demand within the energy supply goal of the consumer.

According to example embodiments, an energy supplier side may directly control a consumption timing of a remote load by controlling a demand management for a charging load based on an active participation order of a consumer using a discontinuous charging scheme. Also, it is possible to secure reliability of the energy charging supply device based on a distribution network management area unit by alleviating a peak demand.

Figure 4:
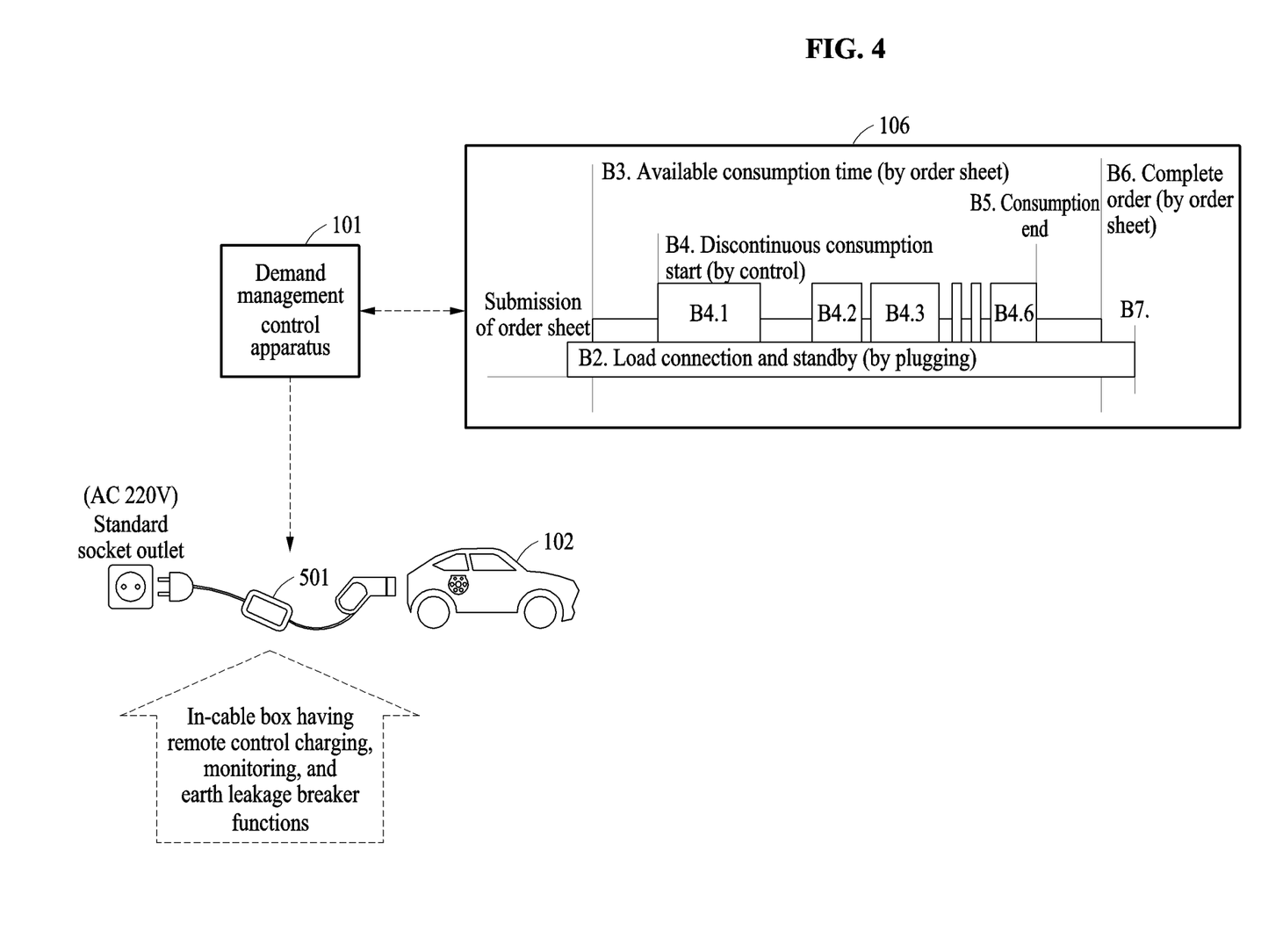
FIG. 4 illustrates a connection relationship between chargers to control charging of a charging load device based on a charging type according to an example embodiment.

FIG. 4 illustrates a connection relationship between chargers to control charging of a charging load device based on a charging type according to an example embodiment.

Referring to FIG. 4, in response to receiving a participation order for a participation promotion based on a charging order sheet 106, a demand management control apparatus 101 may control charging in a peak time according to a charging schedule of a charging load device 102 and may control a peak demand of an energy charging supply device. Here, the charging order sheet 106 may include an available charging start point, an available charging period, a current magnitude, a required capacity (a total area), and an ID of the energy charging supply device (e.g., a socket outlet ID, an ID Of an in-cable box 501).

The demand management control apparatus 101 may perform an intermittent automatic demand management based on a participation order of a consumer. That is, the demand management control apparatus 101 may control charging of the charging load device 102 according to the charging schedule of the charging load device 102 based on a discontinuous consumption scheme. The demand management control apparatus 101 may adjust the charging schedule into consideration of an attribute of the plugged charging load device 102.

For example, a type of the charging load device 102 may be an alternate current (AC) slow charging electric vehicle, a charging infrastructure of the charging load device 102 may be level 1, a charging mode of the charging load device 102 may be 'IEC Mode 2,' and a charger connection method of the charging load device 102 may be 'case B.' Herein, the type of the energy charging supply device may be classified into an "electric vehicle portable charger," a "chargeable portable charger," or a "chargeable outlet charger." The demand management control apparatus 101 may instruct the energy charging supply device to control charging of the charging load device 102 based on the charging mode 'IEC Mode 2,' mainly with respect to the AC slow charging electric vehicle.

Here, a "charging device for energy supply" may include the in-cable box 501. Here, the in-cable box 501 may remotely control and monitor whether to charge the charging load device 102 and may perform a functionality of an earth leakage breaker.

Figure 5:
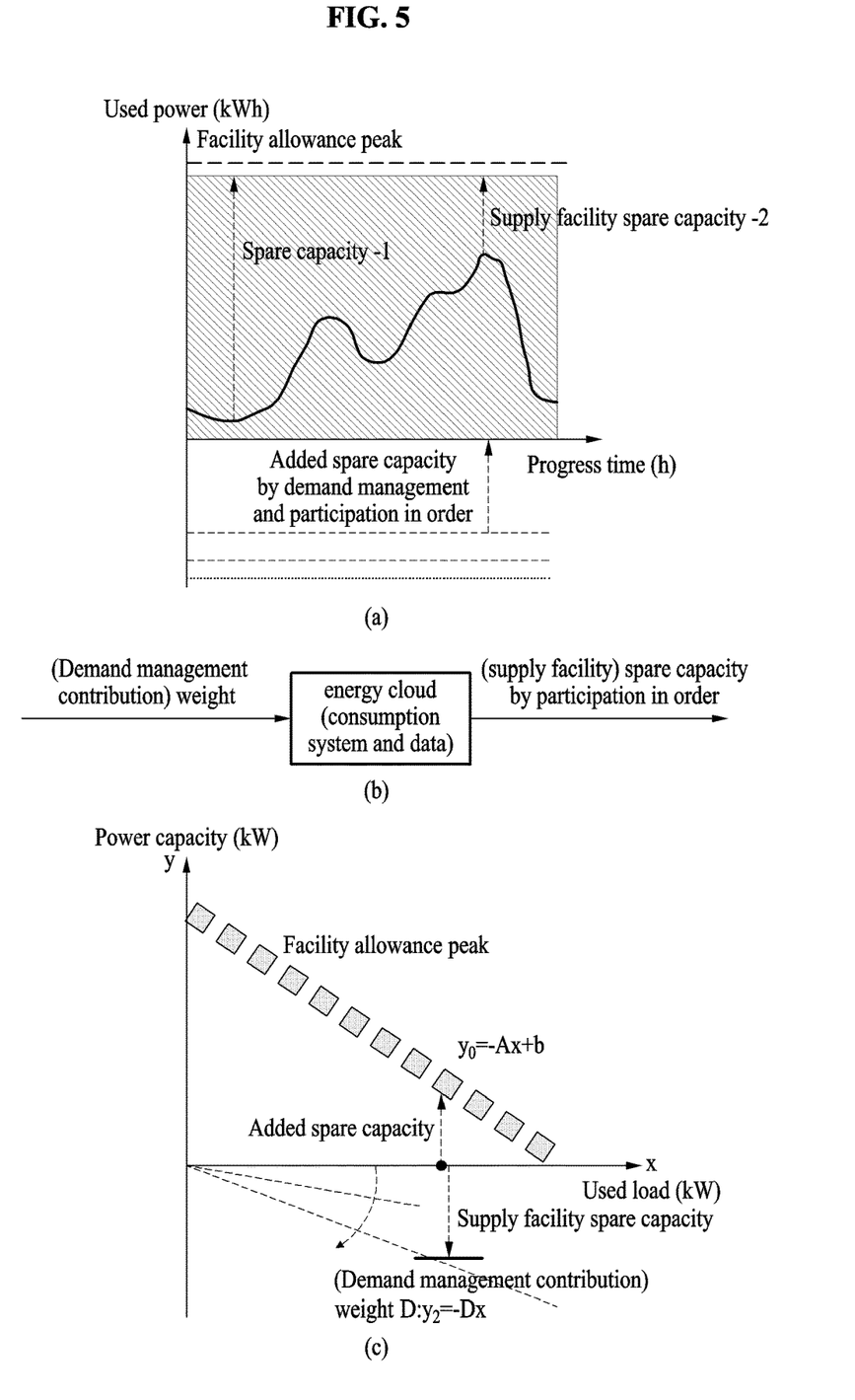

FIG. 5, (a), (b), and (c), illustrate an execution effect and response of a demand management contribution weight according to an example embodiment.

Referring to (a) and (b) of FIG. 5, the demand management control apparatus 101 may secure a spare capacity in an energy charging supply device according to a participation order from a consumer for a demand management. That is, the demand management control apparatus 101 may secure the spare capacity of the energy charging supply device caused by a consumption-side change through an incentive-and-weight reaction. The demand management control apparatus 101 may improve a demand management effect by operating a demand management contribution weight of a charging load device for energy cost.

The demand management control apparatus 101 may provide a participation promotion to a consumer that participates in a demand management program as an incentive for a management contribution performance. Herein, the longer a 'charging allowance period' included in a charging order sheet of the consumer, the more advantageous for a distributed consumption operation. Therefore, the incentive may be measured in proportion to the charging allowance period. Accordingly, the demand management control apparatus 101 may present a separate incentive to increase a number of participation orders from consumers. Here, the charging allowance period and the incentive may be represented by the following Equation 1.

Charging allowance period=[Available charging period−Required charging period]

Incentive=[Demand management contribution weight]×[Charging allowance period]×[Charging order capacity]  [Equation 1]

As described above, the demand management control apparatus 101 may induce expansion of participants for a demand management program through a promotion by providing the incentive and energy cost information to consumers in addition to a method of inducing such participant expansion using a variable incentive with a "demand management contribution weight" from a supplier side.

Referring to (c) of FIG. 5, the demand management control apparatus 101 may determine the demand management contribution weight to more efficiently operate the energy charging supply device in the distribution network management area. The demand management contribution weight may be calculated using, e.g., a method of calculating a supply facility limit and a peak load distribution value as the "demand management contribution weight" and a method of calculating the "demand management contribution weight" through relationship learning between a "supply facility spare capacity" according to a demand prediction value and the "demand management contribution weight" using operation record bigdata of the energy charging supply device in the distribution network management area.

For example, as an example embodiment for an operation of the energy charging supply device in the distribution network management area, it is possible to use an operating system for managing an electric vehicle (EV) charging point in time to reduce peak burden of supply facility in an electricity management room of, e.g., a building, an apartment, and a town.

Referring to a graph shown in (c) of FIG. 5, as consumption x increases, "supply facility spare capacity $y_0$" decreases, "added spare capacity $y_2$" occurs according to operating of a demand management contribution weight D, and available supply facility spare capacity $y_T$ increases, which may be represented by the following Equation 2.

$$y_T = y_0 + y_2 = -Ax + b + Dx \times -(A-D)x + b \qquad \text{[Equation 2]}$$

The demand management control apparatus 101 may compare a supply facility management cost value by the added spare capacity $y_2$ occurring according to operating of the demand management contribution weight to incentive cost spent for implementation of contribution weight expansion and may calculate the demand management contribution weight. The demand management control apparatus 101 may provide information such that a system for a real-time rate operation and demand management may calculate a contribution weight and a supply facility operator may determine an execution.

The demand management control apparatus 101 may obtain an optimal operation value by machine learning an "incentive weight" operation result as pre-secured energy demand and supply data and may provide the optimal operation value such that the supply facility operator may determine the execution. Also, the demand management control apparatus 101 may make improvement for finding an optimal negotiation proposal between a consumer and a supplier using a corresponding response result.

Figure 6:
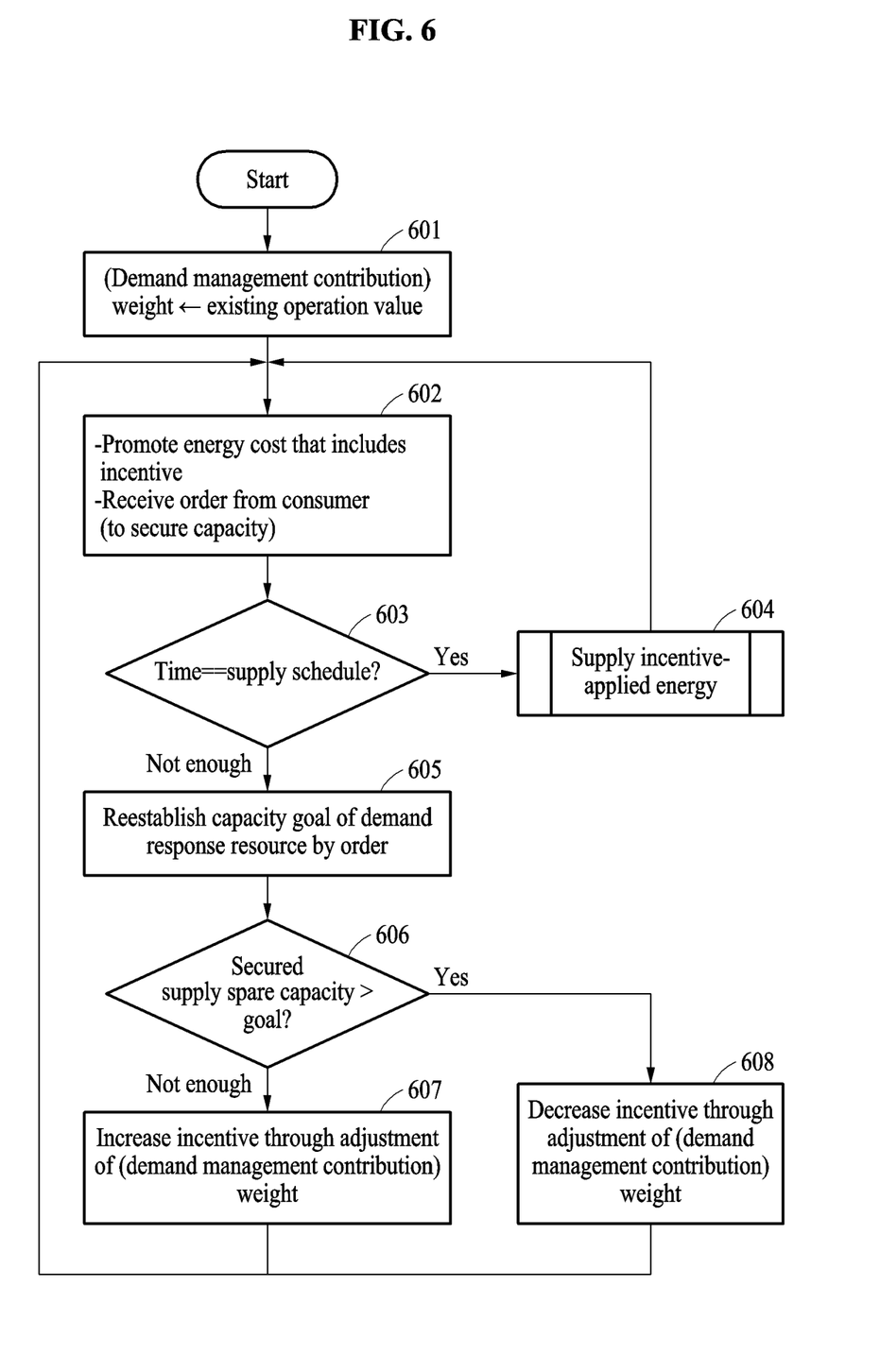
FIG. 6 is a flowchart illustrating a process of applying an incentive by adjusting a demand management contribution weight according to an example embodiment.

FIG. 6 is a flowchart illustrating a process of applying an incentive by adjusting a demand management contribution weight according to an example embodiment.

In operation 601, a demand management control apparatus according to an example embodiment may set a demand management contribution weight of a charging load device for an operation of an energy charging supply device. The demand management control apparatus may set the demand management contribution weight using an existing operation value measured by the energy charging supply device.

In operation 602, the demand management control apparatus may promote energy cost that includes an incentive. The demand management control apparatus may receive a charging order sheet for supplying power to the charging load device that is plugged into the energy charging supply device in a distribution network management area. The demand management control apparatus may secure a demand response resource capacity for a power operation that may be supplied from the energy charging supply device in the distribution network management area based on the charging order sheet. The demand management control apparatus may provide a participation promotion in which the demand management contribution weight of the charging load device for the operation of the energy charging supply device is applied.

In operation 603, the demand management control apparatus may determine whether a charging is possible within a charging allowance period of the charging load device according to a participation order of a consumer.

When the charging within the charging allowance period is possible (Yes), the demand management control apparatus may supply incentive-applied energy to the charging load device in operation 604.

When the charging within the charging allowance period is impossible (No), the demand management control apparatus may reestablish a capacity goal of demand response resource by the participation order of the consumer in operation 605.

In operation 606, the demand management control apparatus may determine whether a capacity goal of the demand response resource and a supply capacity are secured.

When the supply capacity is secured, the demand management control apparatus may adjust the demand management contribution weight and may supply incentive-reduced energy to the charging load device in operation 608.

When the capacity is not secured, the demand management control apparatus may adjust the demand management contribution weight and may supply incentive-increased energy to the charging load device in operation 607.

In addition, the technology disclosed herein may be advantageously used in terms of independence of a grid network. In detail, an existing power supply method relates to a method of producing and transmitting power at a high voltage in a large-scale central power plant. Currently, interest in a self-sufficient method as a small-scale independent distributed power generation source in an area near a consumer is increasing. In this case, a stable demand and supply is enabled with independent power generation and storage.

Therefore, various methods for balancing energy demand and supply may be applied in parallel in terms of strengthening self-reliance of an energy cloud. The energy cloud internally includes an energy generation facility and a consumption load and may use a real-time remote control demand management for an energy consumption load in an accumulation form as a single economical operation cost reduction method through an approach method on a consumption side.

Here, to increase operational independence of the energy cloud, the influence of ⓪ improvement of energy facility efficiency/① securing of an energy source/② charging and discharging of an energy storage system (ESS)/③ a load reduction by demand response needs to be improved. Here, although large cost is required for investment in facility expansion to expand facilities related to ⓪, ①, and ②, ③ may be an economical operation method through a peak load distribution without increasing supply facilities. Therefore, ③ may be used for operational independence of a microgrid through expansion of a control capacity disclosed herein.

Also, in addition thereto, the example embodiment may be applied to an output stabilization method of a power system that includes new and renewable energy and distributed-type power source. In detail, in terms of reducing the use of fossil fuels, wind power generation or solar power generation corresponding to representative new and renewable energy has an irregular output supply characteristic depending on a natural environment. Due to an intermittent supply output, it is a challenge to secure a reliability. This is because a certain amount of positive electricity is not stably generated every time and an output is non-uniform due to great influence from the natural environment. Since the power system is exposed to a significant change according to an increasing connection between the new and renewable energy and the distributed-type power source, an investment is required to secure the reliability.

Therefore, to supplement the intermittence of the output, it is necessary to secure and operate a stabilized supplementary facility such as a sufficient charging and discharging system (ESS) according to a corresponding production capacity. Rather than to rely only on a supply-oriented investment, there is a method of combining a stabilization method on a demand side. An economic demand to overcome a reliability securement issue occurring due to expansion of new and renewable energy not by a supplier side but by a demander sider is also increasing. Therefore, if demand management technology capable of flexibly linking and applying a change state of energy supply proposed herein is applied, it is possible to reduce investment cost on the supplier side in proportion thereto.

Figure 7:
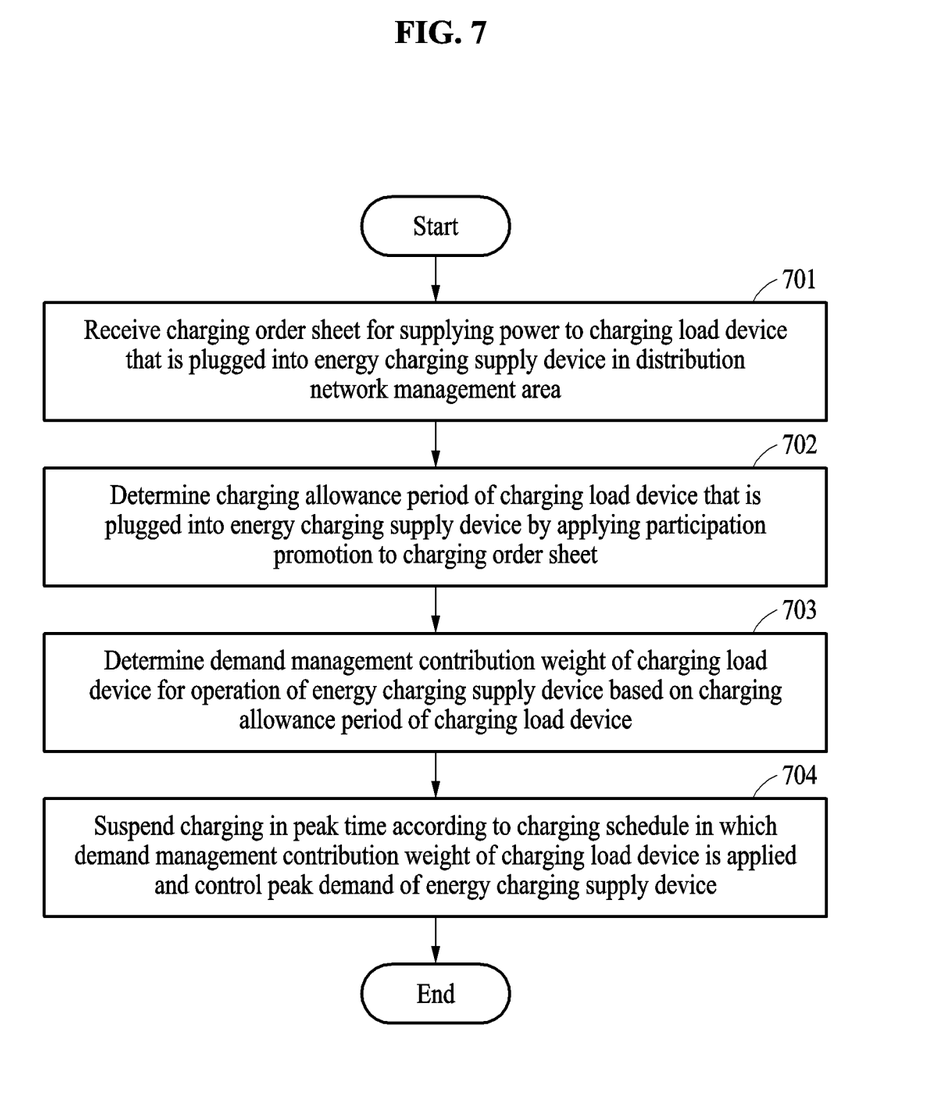
FIG. 7 is a flowchart illustrating a demand management control method according to an example embodiment.

FIG. 7 is a flowchart illustrating a demand management control method according to an example embodiment.

In operation 701, a demand management control apparatus according to an example embodiment may receive, from a user terminal, a charging order sheet for supplying power to a charging load device that is plugged into an energy charging supply device in a distribution network management area. The demand management control apparatus may monitor a consumption status of the distribution network management area to verify an allowable power capacity until the charging load device is plugged power ON through plugging. Once the charging load device is powered ON through plugging, the demand management control apparatus may receive the charging order sheet from the user terminal at a charging start point in time of the charging load device according to the consumption status.

In operation 702, the demand management control apparatus may determine a charging allowance period of the charging load device that is plugged into the energy charging supply device based on the charging order sheet. The demand management control apparatus may determine the charging allowance period based on at least one of an available charging point in time, an available charging period, a current magnitude, and a required capacity included in the charging order sheet. Here, the charging allowance period may represent a period during which charging of the charging load device is temporally holdable according to a charging period required for the available charging period and the required capacity.

In operation 703, the demand management control apparatus may provide a participation promotion in which a demand management contribution weight of the charging load device for an operation of the energy charging supply device according to the charging allowance period of the charging load device is applied. The demand management control apparatus may determine a demand management contribution weight for a rate operation and a demand management of the energy charging supply device using a distribution value of peak load and a charging limit of the energy charging supply device. The demand management control apparatus may determine an incentive for a management contribution performance according to energy cost based on the demand management contribution weight. The demand management control apparatus may provide the participation promotion including the determined incentive to the user terminal.

In operation 704, in response to receiving a participation order for the participation promotion from the user terminal, the demand management control apparatus may control charging in a peak time according to a charging schedule of the charging load device and control a peak demand of the energy charging supply device. The demand management control apparatus may suspend charging in the peak time in which a charging load occurs in the charging process according to the charging schedule and may control the peak demand of the energy charging supply device through discontinuous charging.

Figure 8:
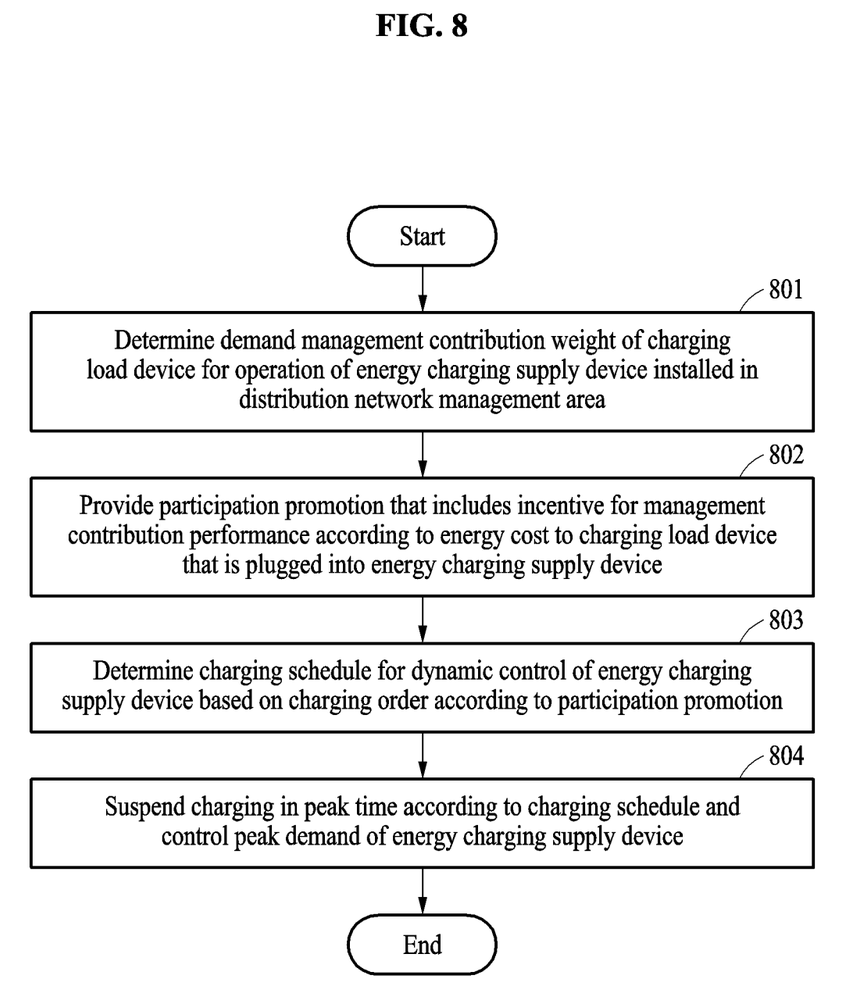
FIG. 8 is a flowchart illustrating a demand management control method according to another example embodiment.

FIG. 8 is a flowchart illustrating a demand management control method according to another example embodiment.

In operation 801, a demand management control apparatus according to an example embodiment may determine a demand management contribution weight of a charging load device for an operation of an energy charging supply device installed in a distribution network management area. The demand management control apparatus may determine a charging allowance period of the charging load device based on at least one of an available charging point in time, an available charging period, a current magnitude, and a required capacity included in a charging order sheet. The demand management control apparatus may determine a demand management contribution weight of the charging load device for an operation of the energy charging supply device in the distribution network management area based on the charging allowance period of the charging load device. Here, the demand management control apparatus may determine a demand management contribution weight for a rate operation and a demand management of the energy charging supply device using a distribution value of peak load and a charging limit of the energy charging supply device.

In operation 802, the demand management control apparatus may provide a participation promotion that includes an incentive for a management contribution performance according to energy cost to the charging load device that is plugged into the energy charging supply device. The demand management control apparatus may variably set an incentive for a management contribution performance based on at least one of the demand management contribution weight, the charging allowance period, and a charging order capacity. The demand management control apparatus may provide the participation promotion for inducing charging of a consumer through the variably set incentive.

In operation 803, the demand management control apparatus may determine a charging schedule for a dynamic control of the energy charging supply device based on a charging order according to the participation promotion.

In operation 804, the demand management control apparatus may control charging in a peak time according to the charging schedule and control a peak demand of the energy charging supply device. The demand management control apparatus may suspend charging in the peak time in which a charging load occurs in the charging process according to the charging schedule and may control the peak demand of the energy charging supply device through discontinuous charging.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media. Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A demand management control method comprising:
    providing, to a user who placed orders with delivery times, a participation promotion that includes an enhanced incentive based on an increase of a charging allowance period; wherein the participation promotion includes a cost benefit information,
    receiving, from the user, a charging order sheet based on the participation promotion for supplying power to a charging load device that is plugged into an energy charging supply device in a distribution network management area;
    generating a charging schedule for the charging load device to have a plurality of irregular time intervals for discontinuous charging within the charging allowance period within the charging order sheet;
    controlling charging, via a processor, in a peak time according to the charging schedule of the charging load device and controlling, via the processor, a peak demand of the energy charging supply device; and
    providing, an incentive to the user for execution performance on demand management, wherein the incentive is proportional to a demand management contribution weight determined by a demand management control apparatus and the charging allowance period.

2. The demand management control method of claim 1, wherein the receiving of the charging order sheet comprises:
    monitoring or predict a load state of the distribution network management area to verify an allowable power capacity until the charging load device is powered ON through plugging; and
    receiving the charging order sheet at a charging start point in time of the charging load device when the charging load device is powered ON through plugging.

3. The demand management control method of claim 1, wherein the charging allowance period is determined based on at least one of an available charging point in time, an available charging period, a current magnitude, and a required capacity included in the charging order sheet.

4. The demand management control method of claim 3, wherein the charging allowance period represents a period during which charging of the charging load device is temporally holdable according to a charging period required for the available charging period and the required capacity.

5. The demand management control method of claim 1, wherein the controlling of the peak demand of the energy charging supply device comprises reducing or holding charging in the peak time in which a charging load occurs in the charging process according to the charging schedule and controlling the peak demand of the energy charging supply device through discontinuous charging.

6. A demand management control method comprising:
determining a demand management contribution weight of a charging load device for an operation of an energy charging supply device installed in a distribution network management area;
providing, to a user who placed orders with delivery times, a participation promotion that includes an enhanced incentive based on an increase of the charging allowance period based on the demand management contribution weight of the charging load device; wherein the participation promotion includes a cost benefit information,
generating a charging schedule for the charging load device to have a plurality of irregular time intervals for discontinuous charging within the charging allowance period within a charging order sheet received based on the participation promotion within the charging order sheet;
controlling charging, via a processor, in a peak time according to the charging schedule and controlling, via the processor, a peak demand of the energy charging supply device; and
providing, an incentive to the user for execution performance on demand management, wherein the incentive is proportional to a demand management contribution weight determined by a demand management control apparatus and the charging allowance period.

7. The demand management control method of claim 6, wherein the controlling of the peak demand of the energy charging supply device comprises reducing or holding charging in the peak time in which a charging load occurs in the charging process according to the charging schedule and controlling the peak demand of the energy charging supply device through discontinuous charging.

8. A demand management control apparatus comprising a processor, wherein the processor is configured to
provide, to a user who placed orders with delivery times, a participation promotion that includes an enhanced incentive based on an increase of a charging allowance period; wherein the participation promotion includes a cost benefit information,
receive, from the user, a charging order sheet based on the participation promotion for supplying power to a charging load device that is plugged into an energy charging supply device in a distribution network management area,
generate a charging schedule for the charging load device to have a plurality of irregular time intervals for discontinuous charging within the charging allowance period within the charging order sheet,
control charging, via the processor, in a peak time according to the charging schedule of the charging load device and control, via the processor, a peak demand of the energy charging supply device; and
providing, an incentive to the user for execution performance on demand management, wherein the incentive is proportional to a demand management contribution weight determined by a demand management control apparatus and the charging allowance period.

9. The demand management control apparatus of claim 8, wherein the processor is configured to determine the charging allowance period by applying the participation promotion based on at least one of an available charging point in time, an available charging period, a current magnitude, and a required capacity included in the charging order sheet.

10. The demand management control apparatus of claim 8, wherein the processor is configured to reduce or hold charging in the peak time in which a charging load occurs in the charging process according to the charging schedule and control the peak demand of the energy charging supply device through discontinuous charging.

* * * * *